(No Model.)
J. V. UPINGTON.
BREAKING CART.
No. 250,303. Patented Nov. 29, 1881.
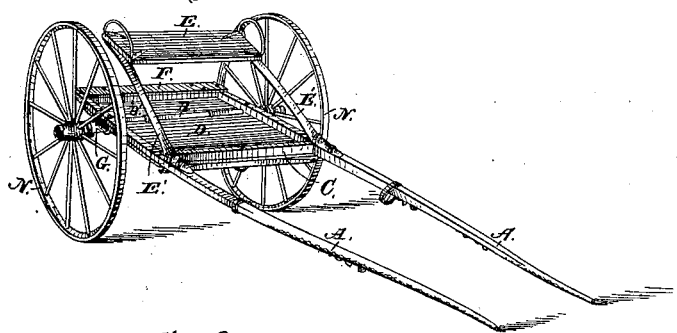
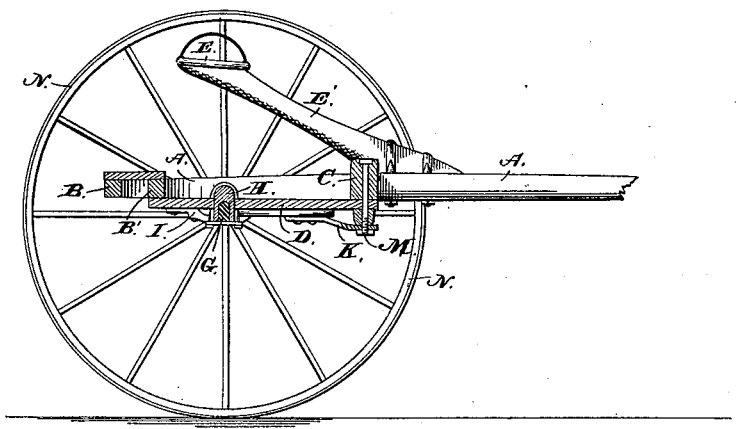
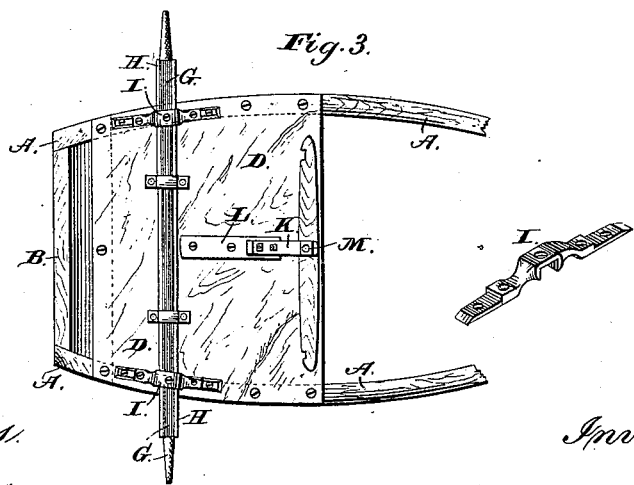
Witnesses:
Jas. E. Hutchinson.
J. A. Rutherford
Inventor:
John V. Upington
by James L. Norris.
Att'y.

UNITED STATES PATENT OFFICE.

JOHN V. UPINGTON, OF LEXINGTON, KENTUCKY, ASSIGNOR OF ONE-HALF TO JAMES T. UPINGTON, OF SAME PLACE.

BREAKING-CART.

SPECIFICATION forming part of Letters Patent No. 250,303, dated November 29, 1881.

Application filed August 23, 1881. (No model.)

*To all whom it may concern:*

Be it known that I, JOHN V. UPINGTON, a citizen of the United States, residing at Lexington, in the county of Fayette and State of Kentucky, have invented new and useful Improvements in Break Carts or Wagons, of which the following is a specification.

This invention relates to a two-wheeled gig or sulky, which is especially designed for use in breaking horses to harness, and which, therefore, I denominate a "break-wagon."

The improvement hereinafter described and claimed is fully illustrated in the accompanying drawings, in which—

Figure 1 is a perspective view of my improved break-wagon. Fig. 2 is a longitudinal central section, and Fig. 3 a plan view of the under side of the vehicle.

A A indicate the shafts of the vehicle, each of which shafts is formed of a single piece of straight-grained timber bent into shape. This construction provides a strong and durable shaft, which will yield when subjected to pressure—such, for example, as when the horse falls down—and when such pressure is removed readily springs back to its normal shape. The shafts extend back of the axle, and practically constitute the sides of the vehicle-body. They are connected together at their rear extremities by the cross-bar B, and also by a cross-bar, B', which is arranged in advance of the cross-bar connecting their ends, both of these said bars being back of the axle. The shafts are further connected together by means of a cross-bar, C, located in front of the axle, these three cross-bars, together with the rear portions of the shafts, constituting a strong, rigid frame, to the under side of which the bottom board, D, is secured by bolts or screws. The front cross-bar, C, is notched at its ends, so as to fit the shafts, and it is made somewhat higher than the shafts, in order to provide a suitable foot-rest for the driver.

E indicates the driver's seat, which is supported by the inclined spring bars or seat-supports E', that are each formed of a single piece of straight-grained timber, and secured at their lower ends to the shafts at any suitable point thereon by means of bolts or clips, as may be desired, but are preferably secured at the point where the cross-bar C connects with the shafts. These spring seat-supports, which are set at an angle to the shafts, extend over and back of the axle, so that the weight will be properly distributed when the driver is seated on the seat supported at the upper ends of the said spring-supports.

A step, F, adapted to enable the driver to mount the seat from the rear of the vehicle, is secured to the upper sides of the shafts, at their back ends, and also to the two rear cross-bars. This step admits of the driver getting onto or off from the seat without passing in front of the wheels, and it also serves as an additional brace for the frame comprising the shafts and cross-bars.

The axle G is fitted and secured by bolts or clips in a channel formed longitudinally in the under side of the axle-holder H, which consists of a wooden bar fitted to the under sides of the shafts, and secured thereto by means of bolts. This said bar is recessed to receive a portion of the shafts in order to be more securely connected with the same, and it extends across and separates the bottom board into two parts, as illustrated. The axle and axle-holder are further secured in place by means of the metal straps or braces I, that are adapted to fit the under side of the axle and axle-holder, and also a portion of the sides of the latter, the said braces being secured to the bottom board by means of screw-bolts that pass through the said board and into the shafts. To further strengthen the bottom board, and also to provide a suitable base for the metal bar K, through which the pivot of the single-tree passes, a brace-bar, L, is secured to the under side of the bottom board in advance of the axle, and arranged at right angles to the latter. The bolt or pivot M, about which the singletree turns, passes through the bar K, and also through the bottom board, into the front cross-bar of the vehicle-frame.

It will be observed that the said frame has an entire bottom formed by said bottom board, and that by securing the same to the under side of the shafts and cross-bars a shallow receptacle is formed, which will be found convenient for carrying various articles.

The whole structure is light and exceedingly strong, and is supported by two wheels, N N, which will be of any desired size. The vehicle is admirably adapted for breaking horses to harness, and it will be found that it will be difficult to tip the same over.

It will be seen that the shallow receptacle formed below the elevated seat can readily be reached from either the front or rear of the seat. While bottom boards have been employed in buggies, yet the arrangement of those herein shown differs from any known to me.

Having thus described my invention, what I claim is—

1. In a two-wheeled break-wagon, the shafts extending back of the seat and axle and connected with the latter, the two cross-bars, B and C, the first being secured to the shafts in rear of axle, and the second being secured to the shafts in front of the axle, and the bottom board D, secured to the rear bar and to the shafts between the said bars, said members being organized substantially as described, and forming a shallow receptacle below the elevated seat, and accessible either from the front or rear of the same, as set forth.

2. The combination, in a two-wheeled break-wagon, of the shafts, with the inclined spring seat-supports, formed of wooden spring-bars, rigidly secured at their lower ends to the shafts at a point near the front cross-bar, substantially as described.

3. The combination, in a two-wheeled break-wagon, of the shafts extending back of the axle, and connected at their rear ends by the two cross-bars B B', and the step F, secured to the shafts and cross-bars back of and below the seat, substantially as described.

4. The combination, in a two-wheeled break-wagon, of the shafts extending back of the axle, with the bottom board, D, secured to the under side of the shafts, the axle-holder H, fitted in a space between the two parts of the bottom board and bolted to the shafts, the axle received in a longitudinal channel in the axle-holder, and the metal braces I, secured to the bottom board and fitting against the axle-holder and axle, substantially as shown and described.

In testimony whereof I have hereunto set my hand in the presence of two subscribing witnesses.

JOHN V. UPINGTON.

Witnesses:
HERMAN SLOFF,
JAS. E. SHRYOCK.